Feb. 1, 1938.  J. W. DAWSON  2,106,831
ELECTRIC CONTROL SYSTEM
Filed April 10, 1935   4 Sheets-Sheet 1

Fig. 1.

WITNESSES:
C. J. Weller.
R R Lockwood

INVENTOR
John W. Dawson.
BY
G. M. Crawford
ATTORNEY

Fig. 2.

Feb. 1, 1938.  J. W. DAWSON  2,106,831
ELECTRIC CONTROL SYSTEM
Filed April 10, 1935  4 Sheets-Sheet 3

Patented Feb. 1, 1938

2,106,831

UNITED STATES PATENT OFFICE 2,106,831

ELECTRIC CONTROL SYSTEM

John W. Dawson, Wilkinsburg, Pa., assignor to Westinghouse Electric & Manufacturing Company, East Pittsburgh, Pa., a corporation of Pennsylvania Application April 10, 1935, Serial No. 15,730

26 Claims. (Cl. 250—27)

My invention relates generally to electric control systems, and it has particular relation to systems for controlling the flow of current in alternating current circuits.

In an electric system in which alternating current is supplied to a load device, it is desirable under certain conditions to permit the alternating current to flow to the load device during a predetermined interval of time or for a predetermined number of cycles of the alternating current. Such conditions are present in a spot or resistance welding application where optimum welding results require that an exact amount of current be supplied to perform the welding operation. If too much current is supplied, the work being welded may be burned while if too little current is supplied proper welding may not be accomplished.

Ordinarily, the alternating current is supplied as a series of half cycles under the control of unidirectional conducting electric valves, each of which is adapted to conduct one-half cycle of opposite polarity with respect to the other valve. Since as many positive as negative half cycles of the alternating current are conducted, saturation in magnetic circuits associated with the alternating current circuit is prevented. In addition, a maximum amount of power may be supplied to the load device in a minimum of time. Under certain conditions, however, of low power demand and where high leakage transformers are employed, it is possible to use a single valve and conduct only half cycles of one polarity to the load.

In order to conduct successive half cycles of the alternating current, the uni-directional conducting valves are oppositely connected. That is, the anode of one valve and the cathode of the other valve are connected to the source of alternating current while the other anode and the other cathode are connected together and to one terminal of the load device. Each of the valves is provided with a control electrode and is adapted to be rendered conducting by the application of energizing potential thereto relative to either the anode or the cathode, depending upon the type of valve that is used. It will be apparent that any control system that is used must be adapted to control the application of the energizing potential to the control electrodes relative, for example, to the anode of one of the valves and to provide for the application of the energizing potential to the other valve under the same conditions, although their respective anodes are separated electrically from each other by 180 electrical degrees. In other words, since the anodes and cathodes of the valves are at opposite potentials, it is difficult to provide a common control for the control electrodes.

The control system employed in conjunction with the control electrodes of the valves, has, in the past, been directly electrically connected to the control electrodes. This arrangement has complicated the insulation problem involved in the system particularly when the valves are connected in a high potential circuit.

The object of my invention, generally stated, is to provide an electric control system which shall be simple and efficient in operation and which may be readily and economically manufactured and installed.

The principal object of my invention is to provide for rendering conducting an electric valve connected to permit the flow of alternating current by applying thereto a high frequency energizing potential by inductive means thereby rendering unnecessary direct electrical connection of the control system to the circuit in which the valve is connected.

An important object of my invention is to provide for rendering an electric valve conducting for a predetermined interval of time to permit the flow of alternating current by applying thereto a high-frequency potential during the interval, thereby permitting a predetermined number of half cycles of the alternating current to flow.

Another object of my invention is to provide a pair of oppositely connected electric valves for controlling the flow of current from an alternating current source to a load device and controlling the conductivity of the valves by applying thereto high-frequency energizing potentials.

Still another object of my invention is to provide a pair of oppositely connected electric valves for controlling the flow of current from an alternating current source to a load device and controlling the conductivity of the valves by applying thereto high-frequency energizing potentials for a predetermined interval of time to permit the flow of alternating current only during the interval.

Still another object of my invention is to provide for controlling the operation of an oscillator for a time interval depending upon the discharge rate of a capacitor.

A still further object of my invention is to provide for selectively controlling the conductivity of any of a plurality of electric valves by applying high-frequency ionizing potentials to the control electrodes thereof at frequencies for which the control circuits individual to the control electrodes are tuned.

Other objects of my invention will in part be obvious and in part appear hereinafter.

My invention, accordingly, is disclosed in the embodiment hereof shown in the accompanying drawings and comprises the features of construction, combination of elements and arrangement of parts which will be exemplified in the constructions hereinafter set forth and the scope of the application of which will be indicated in the appended claims.

For a more complete understanding of the nature and scope of my invention, reference may be had to the following detailed description taken in connection with the accompanying drawings, in which.

According to my invention, I provide a pair of oppositely connected electric valves which are arranged to control the flow of current from an alternating current source to a load device. Each of the valves is provided with a control electrode to which is applied a biasing potential for maintaining the valves in the non-conducting state. In order to render the valves conducting, I have provided for applying high-frequency oscillations to the control electrode at such a frequency that in effect it may be considered that a direct current biasing potential is applied thereto sufficient to overcome the blocking potential which maintains the valves in the non-conducting state.

Figure 1:
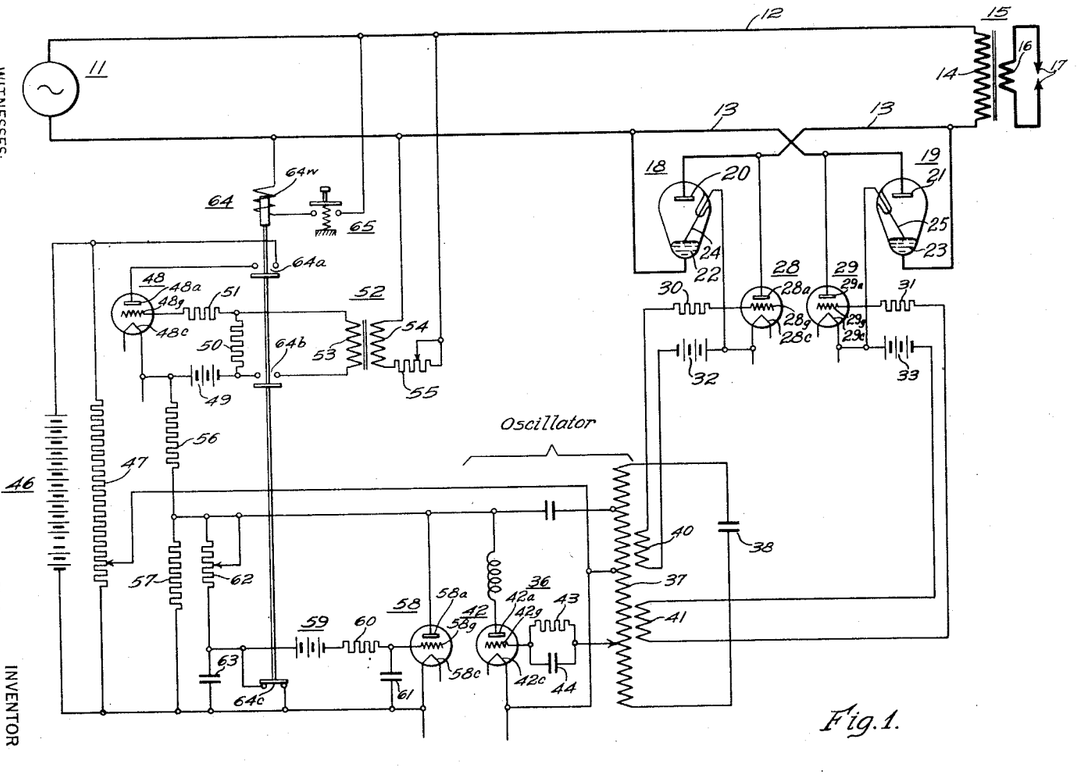
Figure 1 illustrates diagrammatically one concrete embodiment of my invention.

In the embodiment of my invention illustrated in Fig. 1, I have provided an oscillator of the Hartley type for generating the high-frequency oscillations. The oscillator is started in operation by the application thereto of sufficient anode voltage to cause the oscillator to function. After the expiration of a predetermined time, the energizing potential is removed from the oscillator and it ceases to function. During the time when the oscillator is functioning, the electric valves are rendered conducting and alternating current is permitted to flow to the load device.

Figure 2:
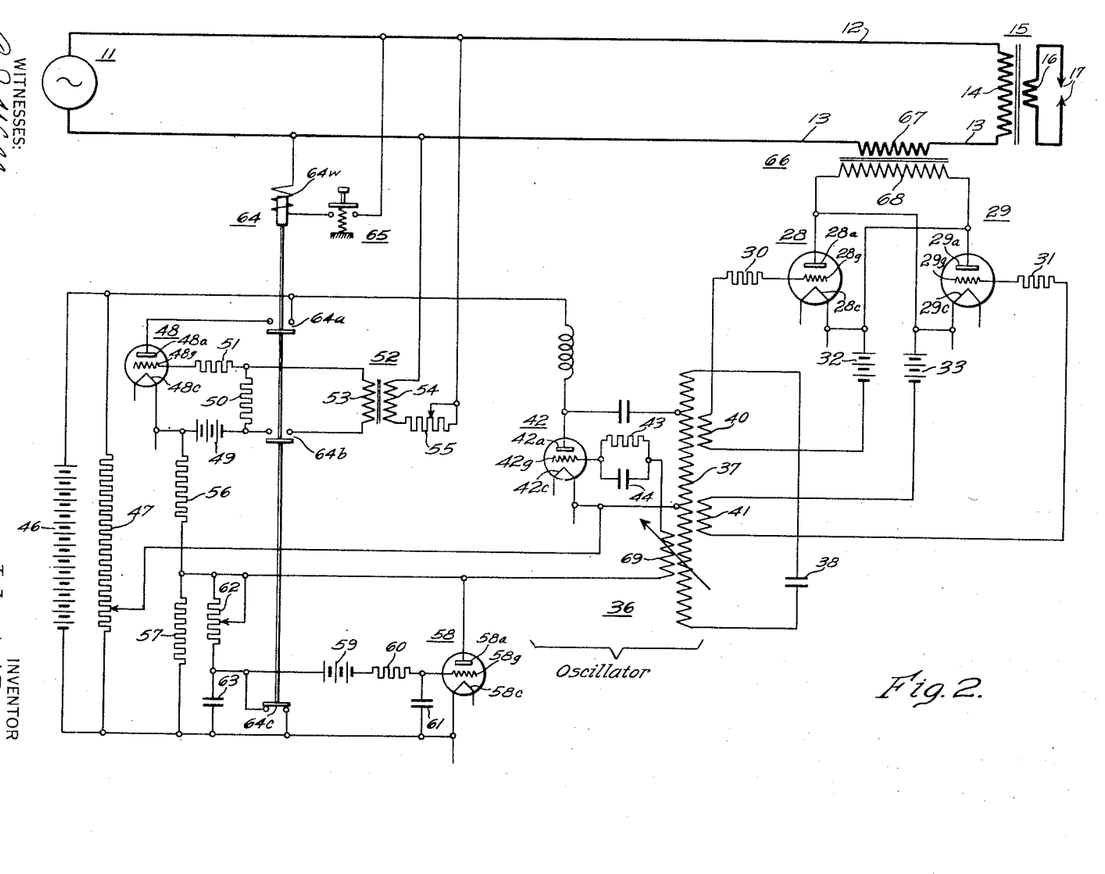
Fig. 2 illustrates diagrammatically another embodiment of my invention.

In a modification of the invention shown in Fig. 2 of the drawings, normal energizing potential is continuously applied to the anode of the oscillator tube 42. However, a suitable biasing potential is applied to the grid to prevent operation of the oscillator except during the interval permitted by the timing circuit.

Figure 3:
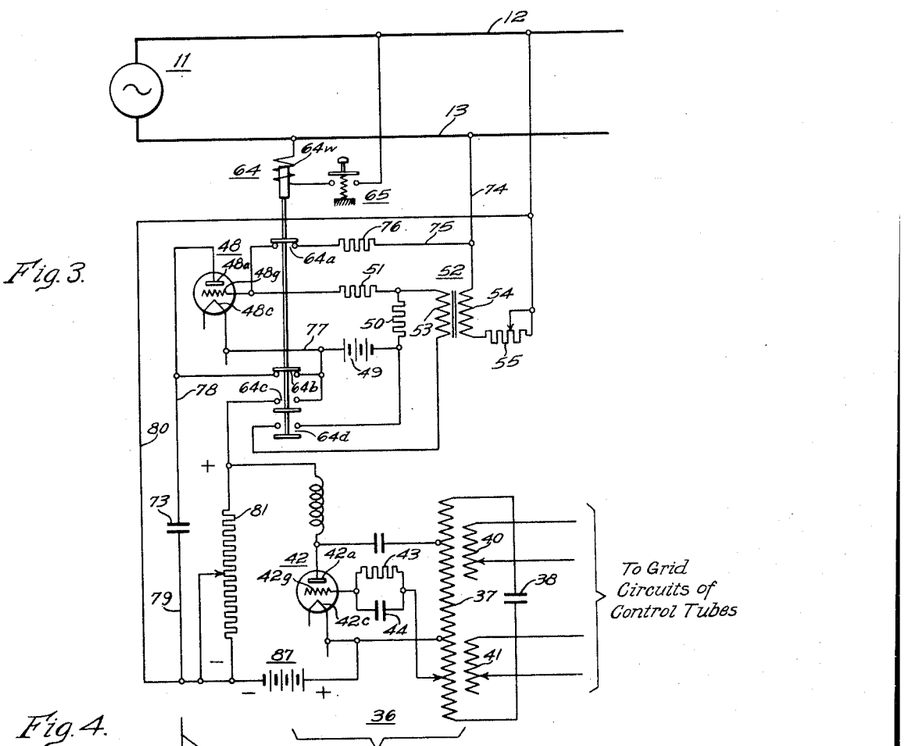
Fig. 3 illustrates diagrammatically still another embodiment of my invention which may be employed in conjunction with either of the circuits illustrated in Figs. 1 and 2.

In another modification of the invention illustrated in Fig. 3 of the drawings, the time during which the oscillator is maintained in operation depends upon the discharge rate of a capacitor. The capacitor is charged to a predetermined potential and then is caused to discharge through a resistor, the voltage across which is applied to the oscillator tube in opposition to a biasing voltage which tends to maintain the oscillator in the non-operated condition. The oscillator will remain in operation during an interval which depends upon the time required for the capacitor to be discharged, so that the voltage across it equals the opposing biasing voltage.

Referring now particularly to Fig. 1 of the drawings, the reference character 11 designates generally a source of low frequency alternating current such as a 60-cycle generator. The generator 11 is arranged to be connected by means of conductors 12 and 13 to the primary winding 14 of a transformer 15 constituting a load device. The transformer 15 is provided with a secondary winding 16 which may, for example, be connected to supply current to a pair of welding electrodes 17 between which a resistance welding operation may be performed.

In order to control the flow of current to the transformer 15, a pair of arc discharge devices 18 and 19 is interposed in the conductor 13, as illustrated. The arc discharge devices 18 and 19 are each provided, respectively, with anodes 20, 21, mercury pool cathodes 22, 23 and control electrodes 24, 25. It will be observed that the anode 21 and the cathode 22 are connected to one terminal of the generator 11, as represented by the conductor 13 while the other anode 20 and the cathode 23 are connected to one terminal of the primary winding 14 as represented by the remaining portion of the conductor 13.

The arc discharge devices 18 and 19 are rendered conducting by causing current to flow from the anode 20 or 21 through the control electrode 24 or 25 to the cathode 22 or 23. A cathode spot is formed by this flow of current which causes the arc discharge devices 18 and 19 to become conducting provided the proper half cycle of the alternating current is applied thereto for which they are individually adapted to become conducting.

In order to control the flow of current between the anodes and the control electrodes of the arc discharge devices 18 and 19, control tubes 28 and 29 individual thereto may be provided. As illustrated, each of the control tubes is respectively provided with an anode 28a, 29a, a control electrode or grid 28g, 29g and a hot cathode 28c, 29c. The control tubes 28 and 29 are preferably of the gas filled arc discharge type.

In the circuits to the grids 28g and 29g, grid resistors 30 and 31 are respectively provided through which a negative potential may be applied to the grids by means of direct current sources represented by the batteries 32 and 33. The negative biasing potentials thus applied serve to normally maintain the control tubes 28 and 29 in the non-conducting condition.

In order to render the control tubes 28 and 29 conducting, an oscillator shown generally at 36 may be provided. The oscillator 36, as set forth hereinbefore, may be of the Hartley type. It will be understood, however, that any other suitable form of oscillator may be employed without departing from the scope of my invention.

The oscillating circuit of the oscillator 36 comprises an inductor 37 and a capacitor 38. Secondary windings 40 and 41 individual, respectively, to the grids 28g and 29g are disposed in inductive relation to the inductor 37. It will be understood that the windings 40 and 41 have induced therein the frequency which is generated by the oscillator 36.

The oscillator 36 is provided with an oscillator tube 42, preferably of the high vacuum type, and has positioned therein an anode 42a, a control electrode or grid 42g and a hot cathode 42c. In this modification of the invention, the grid 42g is connected through a grid resistor 43 shunted by a capacitor 44 to an adjustable connection along the inductor 37.

For the purpose of energizing the oscillator 36, a direct current source, which may be represented by the battery 46, is provided. The battery 46 is arranged to cause current to flow through a potentiometer 47, the adjustable connection of which is arranged to be connected, as illustrated, to the hot cathode 42c. It will be observed that a negative biasing potential is applied to the cathode 42c from the potentiometer 47; this negative potential is provided in order to insure that the oscillator tube 42 will cease operating at the desired time as will be set forth hereinafter.

With a view to initiating the operation of the oscillator 36, a start tube, shown generally at 48 and preferably of the arc discharge type, is provided. The start tube 48 has an anode 48a, a control electrode or grid 48g and a hot cathode 48c. A direct current source such as a battery 49 is provided for applying a biasing potential through resistors 50 and 51 to the grid 48g, in order to maintain the start tube 48 in the non-conducting condition. In order to render the start tube 48 conducting, a peaking transformer 52 is provided having a secondary winding 53 disposed to be connected across the resistor 50 and a primary winding 54, that is connected through a potentiometer 55 to be energized from the alternating current generator 11.

The combination of the primary winding 54 and the potentiometer 55 provides a phase shifting circuit which permits the phase relationship of the peaks occurring in the secondary winding 53 to be shifted with respect to the frequency of the alternating current source to any relation which may be desired. When the polarity of the peak voltage applied across the resistor 50 is such as to oppose and overcome the biasing potential which is supplied by the source 49, the proper ionizing potential is applied to the grid 48g and the start tube 48 breaks down and becomes conducting. Ordinarily it is desirable to adjust the phase shifting circuit so that the start tube 48 is rendered conducting at the normal zero point at the beginning of the current wave.

On becoming conducting, the start tube 48 permits current to flow from the battery 46 through resistors 56 and 57. It will be observed that the anode 42a of the oscillator tube 42 is connected to the junction of the resistors 56 and 57. Since the cathode 42c is connected to the movable connection along the potentiometer 47, a voltage is impressed across the anode 42a and the cathode 42c which is sufficient to cause the oscillator 36 to operate. As long as a voltage drop exists across the resistor 57, caused by the current flow therethrough, the oscillator 36 will remain in operation.

One method of stopping the operation of the oscillator 36 is to remove the potential existing across the resistor 57. This is accomplished by means of a stop tube, shown generally at 58 and preferably of the arc discharge type, which, when rendered conducting, is effective to short circuit the resistor 57. As illustrated, the stop tube 58 has an anode 58a, a control electrode or grid 58g and an anode 58c. Normally, the stop tube 58 is maintained in the non-conducting state by means of a direct current source, such as a battery 59, which is connected to apply a negative biasing potential to the grid 58g through a grid resistor 60.

The stop tube 58 may be rendered conducting by the application of potential across the resistor 57 which causes a potential to be suddenly applied to the anode 58a that may in effect cause the potential on the grid 58g to approach that of the anode 58a due to the relative capacity existing between the grid 58g and the anode 58a as compared with the capacity between the grid 58g and the cathode 58c. In order to obviate this difficulty, a capacitor 61 is connected between the grid 58g and the cathode 58c in order to maintain the grid 58g at a predetermined potential relative to the anode 58a regardless of the potential which may be applied thereto.

It is desirable to initiate the operation of the stop tube 58 a predetermined time after the start tube 48 has been rendered conducting in order to permit the flow of current to the load device 15 only during a predetermined interval. For this purpose, a time delay circuit comprising a potentiometer 62 and a capacitor 63 is provided and connected in shunt circuit relation with the resistor 57. As soon as the start tube 48 becomes conducting, the capacitor 63 assumes a charge at a rate depending upon the setting of the potentiometer 62. When the charge assumed by the capacitor 63 is sufficient to overcome the biasing potential applied to the grid 58g by the battery 59, the stop tube 58 becomes conducting and short circuits the resistor 57.

For the purpose of controlling the operation of the start tube 48 and the stop tube 58, a control relay 64 is provided having an operating winding 64w which may be energized by the operator on the closure of a push button switch 65 that is connected, as illustrated, to energize the winding 64w from the alternating current source 11.

In describing the operation of the system, it will be assumed that the generator 11 is supplying proper voltage to the conductors 12 and 13, that the welding electrodes 17 are in engagement with the work on which the welding operation is to be performed and that the remaining circuits are in the condition illustrated in the drawings. When the operator desires to permit the current to flow to perform the welding operation, he depresses the push button switch 65, thereby energizing the operating winding 64w of the switch 64, closing contact members 64a and 64b and opening contact members 64c.

It will be observed that at contact members 64a the circuit is completed for connecting the anode 48a of the start tube 48 to the battery 46. It will also be observed that the secondary winding 53 of the peaking transformer 52 is connected at contact members 64b across the resistor 50. The contact members 64b may be arranged to close slightly after contact members 64a are closed in order to insure that the latter are closed before a control function takes place. Contact members 64c are opened to remove the short circuit which is normally applied to the capacitor 63.

As soon as the proper peaked voltage, as provided by the peaking transformer 52 and adjusted by the potentiometer 55, is applied across the resistor 50, the start tube 48 is caused to be conducting to permit flow of current through the resistors 56 and 57. It will be understood that the time in any half cycle at which the start tube 48 is rendered conducting may be adjusted by means of the potentiometer 55 which may be previously calibrated so that the operator can readily adjust it.

On flow of current through the resistor 57, sufficient energizing potential is applied to the oscillator tube 42 to render it conducting and the oscillator 36 then generates the oscillations for which it is adjusted. These oscillations are induced in the windings 40 and 41 and are, in turn, applied to the grids 28g and 29g of the control tubes 28 and 29, respectively. Since the amplitude of the high-frequency oscillations is greater than the potential provided by the biasing battery 32 or 33, and further since the frequency supplied by the oscillator 36 is so high, for example, 60,000 cycles per second, the effect on the grids 28g and 29g is that of a direct current during the half cycle for which the control tubes 28 and 29 are adapted to be conducting. Thus as long as the oscillator 36 remains in operation, the control tubes 28 and 29 will be rendered conducting during successive half cycles of the low frequency current at the instant that the first positive half cycle of the high frequency current flows.

As set forth hereinbefore, as soon as current is caused to flow through the resistor 57, the capacitor 63 begins to assume a charge at a rate depending upon the setting of the potentiometer 62. When the time has elapsed for which the timing circuit is set, a sufficient potential will be applied to the grid 58g to overcome the negative biasing potential provided by the battery 59. As a result, the stop tube 58 will be rendered conducting, the resistor 57 will be short circuited and the oscillator 36 will cease to function.

The operator then releases the push button switch 65 and deenergizes the operating winding 64w. At the contact members 64c the capacitor 63 is short circuited in order to insure that it will be fully discharged. It will then be apparent that the interval during which the oscillator 36 is permitted to operate before the start tube 58 becomes conducting and after the start tube 48 has been rendered conducting will always be the same.

Referring now particularly to Fig. 2 of the drawings, it will be observed that the arc discharge devices 18 and 19 have been omitted and that a series transformer 66, having a primary winding 67 inserted in the conductor 13, is provided. The transformer 66 is provided with a high voltage secondary winding 68 which is arranged to be short circuited by means of the control tubes 28 and 29. When the control tubes 28 and 29 are rendered conducting, the impedance of the transformer 66 is reduced to a minimum and current is permitted to flow to the load device 15. When the control tubes 28 and 29 are rendered non-conducting, the impedance of the transformer 66 is relatively great and very little current is permitted to flow to the load device 15.

The circuit shown in Fig. 2 is substantially a duplicate of that shown in Fig. 1 for the remaining portion with the exception of the control for the oscillator tube 42. In the modification of the invention illustrated in Fig. 2 of the drawings, the anode 42a and the cathode 42c are connected to be energized continuously from the battery 46. The start tube 48 and the stop tube 58 are disposed to control the ionizing potential which is applied to the control grid 42g of the oscillator tube 42. It will be observed that a winding 69 is provided in adjustable inductive relation with the inductor 37 of the oscillator 36 in the circuit to the grid 42g in order to provide the necessary coupling to cause the oscillator 36 to function.

Normally, the oscillator tube 42 is maintained in the non-conducting state by the negative potential which is applied to the grid 42g from the potentiometer 47. As soon as the start tube 48 is rendered conducting in the manner set forth hereinbefore, a positive potential is applied to the grid 42g from across the resistor 57 which is sufficient to overcome the normally applied negative biasing potential. As a result, the oscillator tube 42 is rendered conducting and the oscillator 36 is effective to supply the high-frequency energizing potential in the windings 40 and 41 for rendering the control tubes 28 and 29 conducting.

In the manner set forth hereinbefore, the stop tube 58 is rendered conducting after the expiration of a predetermined time interval and as a result, the positive biasing potential is removed from the grid 42g and the oscillator tube 42 is rendered non-conducting. During the interval while the oscillator 36 is in operation, the control tubes 28 and 29 are maintained in the conducting state, the impedance of the transformer 66 is reduced to a minimum and maximum current is permitted to flow to the load device 15.

In Fig. 3 is illustrated an alternative controlling system for the oscillator 36 which may be substituted in either of the circuits shown in Fig. 1 or Fig. 2. In this modification of the invention, a capacitor 73 is provided to take the place of the battery 46 of Figs. 1 and 2. The capacitor 73 is charged to a predetermined potential by utilizing the grid rectifying characteristic of the start tube 48.

The circuit for charging the capacitor 73 may be traced from the energized conductor 13 through conductors 74 and 75, resistor 76, normally closed contact members 64a, grid 48g, cathode 48c, conductor 77, contact members 64b, conductor 78, capacitor 73 and conductors 79 and 80 to the energized conductor 12.

The capacitor 73 is arranged to be discharged through a timing potentiometer 81 when the start tube 48 is rendered conducting at a time depending upon the adjustment of the potentiometer 55, as set forth hereinbefore. Under normal conditions, the oscillator tube 42 is maintained in the non-conducting condition by means of a biasing potential which may be obtained from a direct current source, such as the battery 87 which is connected to the cathode 42c.

When it is desired to initiate the operation of the oscillator 36, the operator closes the push button switch 65. At contact members 64a and 64b, the previously traced charging circuit for the capacitor 73 is opened. At contact members 64c, an obvious circuit is completed to permit the discharge of the capacitor 73 through the timing potentiometer 81 when the start tube 48 is rendered conducting. At contact members 64d, the circuit from the secondary winding 53 of the peaking transformer 62 is completed.

In this modification of the invention, the windings 40 and 41, which may be connected to the control tubes 28 and 29 of either Fig. 1 or Fig. 2 have been indicated as being adjustable for the purpose of varying the amplitude of the high frequency potential which is applied to their respective grids.

Figure 4:
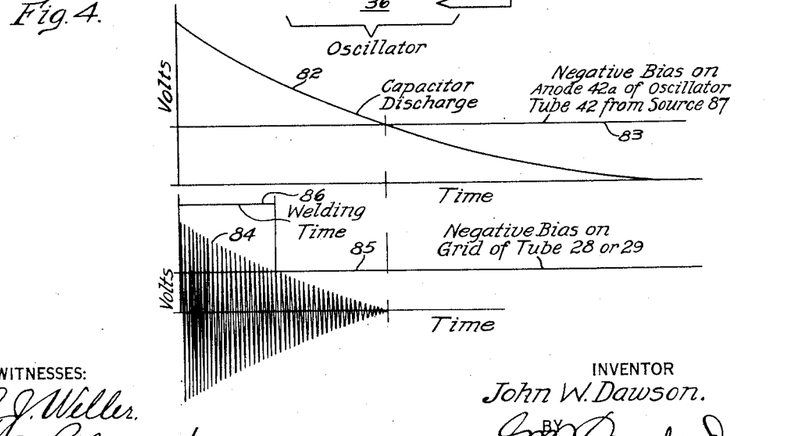
Fig. 4 shows some curves which demonstrate the characteristics of operation of the circuit shown in Fig. 3.

In order to more clearly illustrate the functioning of the system shown in Fig. 3, reference may be had to the curves shown in Fig. 4. In the upper portion of this figure, the curve 82 represents the rate at which the capacitor 73 is discharged, volts being plotted as ordinates and time as abscissae. The curve 83 represents the negative biasing potential on the anode 42a of the oscillator tube 42 from the source 87. As indicated by the curve 84, which represents the oscillations generated by the oscillator 36, the oscillator will be maintained in operation during the time when the voltage represented by the curve 82 is greater in numerical value than the voltage represented by the curve 83. The time at which these curves intersect represents the time at which the oscillator tube 42 will cease functioning. The curve 85 represents the negative bias which is applied to the grid of either of the control tubes 28 or 29. As illustrated, this voltage opposes the upper half of the high frequency oscillations represented by the curve 84. During the time when the positive portion of the high frequency oscillations is greater than the value represented by the curve 85, the control tubes 28 and 29 will be maintained in the conducting state. This time is represented by the abscissa 86 which represents the time during which current is supplied to the load device 15.

The circuits shown in Figs. 5 through 9 represent various connections which may be employed for controlling the operation of the control tube 28. Each of these figures will be separately referred to in order to point out the novel features incorporated therein.

Figure 5:
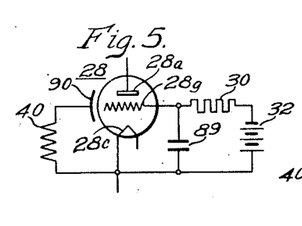
Figs. 5 through 9 show various modifications of the circuits connected to the control electrodes of the electric valves.

As illustrated in Fig. 5, the battery 32 is disposed to apply a negative biasing potential to the control grid 28g through the resistor 30. In order to insure that the control tube 28 will not be rendered conducting on the application of potential to the anode 28a, a capacitor 89 is connected between the grid 28g and the cathode 28c, which is of sufficient value to maintain the grid 28g at a predetermined potential relative to the cathode 28c, regardless of the potential which is applied to the anode 28a.

In order to initiate the operation of the control tube 28, one plate of a capacitor 90, which may be in the form of a metallic cylinder surrounding the control tube 28, is provided and connected, as illustrated to the winding 40. On the generation of high frequency oscillations in the winding 40, the capacitor effect between the element 90 and the elements of the control tube 28 will be sufficient to overcome the negative blocking potential applied by the battery 32 and the control tube 28 will be rendered conducting.

Figures 6, 7:
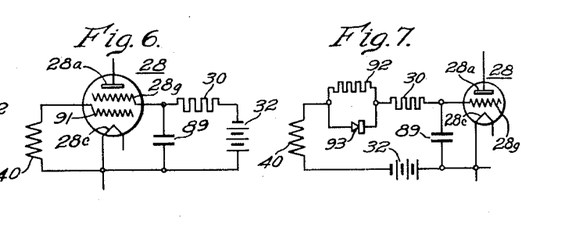

The circuit shown in Fig. 6 is identical with that illustrated in Fig. 5, with the exception that a second control grid 91 is provided in the control tube 28. The second control grid 91 may be connected to the winding 40 in which are generated the high frequency oscillations.

In Fig. 7, the battery 32 is arranged to maintain the negative blocking potential on the control grid 28g through a resistor 92, in addition to the resistor 30. Under normal operating conditions, the capacitor 89 will be charged by the battery 32. On the generation of high frequency oscillations in the winding 40, the charge which was impressed on the capacitor 89 is reversed due to the effect of a rectifier 93 which is connected in shunt circuit relation with the resistor 92. The ohmic resistance of the resistor 92 is made considerably higher than that of the resistor 30, so that on the application of high frequency oscillations it is possible to rapidly change the potential to which the capacitor 89 is charged and thus to render the tube 28 conducting. Since, in this modification of the invention, the grid 28g does not have impressed thereon the high frequency control potential, the capacity of the capacitor 89 may be relatively large thereby insuring that the potential of the grid 28g will be maintained at a predetermined value relative to the potential of the anode 28a regardless of the potential which may be applied thereto.

Figure 8:
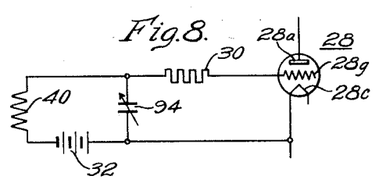

In the circuit illustrated in Fig. 8, an adjustable capacitor 94 is provided in order to tune the control circuit for the grid 28g to a predetermined frequency which may be supplied from the oscillator 36.

Figure 9:
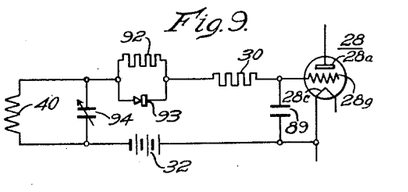

In Fig. 9, the features of the circuits illustrated in Figs. 7 and 8 are combined.

Figure 10:
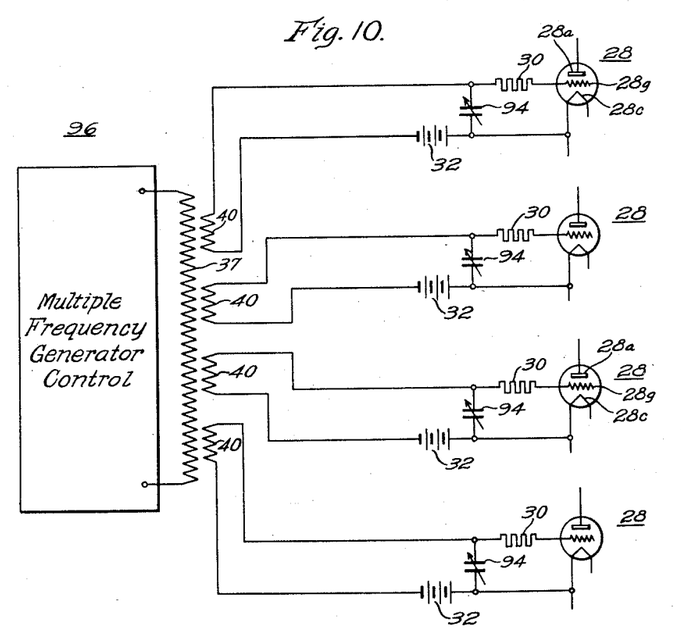
Fig. 10 illustrates diagrammatically the application of my invention in conjunction with a plurality of individually controllable electric valves.

Since the control circuit to the grid 28g may be made responsive to various frequencies by employing the tuning circuits of Fig. 8 or Fig. 9, it will be apparent that a single oscillator may be provided for controlling the operation of a plurality of control tubes 28, as illustrated in Fig. 10 of the drawings. In this figure, a multiple frequency generator control, shown generally at 96 is illustrated to generate various high frequencies in the inductor 37 which may be transferred inductively to the windings 40 for controlling the operation of the various control tubes 28.

It will be readily understood that the generator 96 may comprise the oscillator 36, shown in Figs. 1 and 2, with suitable means for tuning it to operate at different frequencies. In like manner, the various capacitors 94 may be adjusted to tune the grid circuits individual thereto to the various frequencies which may be generated by the generator 96. The timing circuit illustrated in Fig. 3 may also be employed in connection with any of the control tubes 28 of Fig. 10 to render any one of them or combination of them, conducting during predetermined time intervals.

Since certain further changes may be made in the foregoing constructions and different embodiments of the invention may be made without departing from the scope thereof, it is intended that all matter shown in the accompanying drawings or set forth in the accompanying specification shall be interpreted as illustrative and not in a limiting sense.

I claim as my invention:

1. An electric system comprising, in combination, a source of low-frequency current, a load device, circuit means connecting the load device to the current source including a pair of unidirectional conducting valves for permitting the low-frequency current to flow in half cycle increments, both of said valves having principal electrodes, circuit connections in which the potentials of the homologous principal electrodes of said valves are maintained independent of each other, high-frequency current means to initiate the flow of low-frequency current to said load device at the time said valves receive energy from said high frequency current means and means for permitting the application of said high-frequency current to be initiated at a time determined by the voltage waves of said source.

2. An electric system comprising, in combination, a source of low-frequency current, a load device, circuit means connecting the load device to the current source including a pair of inversely connected unidirectional conducting valves for permitting successive half cycles of the low-frequency current to flow, control means individual to each valve, and high-frequency current means for energizing said control means to render said valves conducting.

3. An electric system comprising, in combination, a source of low-frequency current, a load device, circuit means connecting the load device to the current source including a pair of inversely connected uni-directional conducting valves for permitting successive half cycles of the low-frequency current to flow, control means individual to each valve, a high-frequency current generator including a space discharge device provided with an anode, a cathode and a control grid connected to apply high-frequency current to said control means for rendering said valves conducting to permit the flow of low-frequency current to said load device, a source of energizing potential for said generator, and means for applying said energizing potential across said anode and cathode for a predetermined interval of time to permit a predetermined number of successive half cycles of the low-frequency current to flow to said load device.

4. An electric system comprising, in combination, a source of alternating current, a load device, circuit means connecting the load device to the current source including a pair of inversely connected arc discharge devices for conducting successive half cycles of the alternating current, a control electrode individual to each arc discharge device, and high-frequency means for energizing said electrodes to render said arc discharge devices conducting.

5. An electric system comprising, in combination, a source of alternating current, a load device, circuit means connecting the load device to the current source including a pair of inversely connected arc discharge devices for conducting successive half cycles of the alternating current, a control electrode individual to each arc discharge device, a high-frequency current generator including a space discharge device provided with an anode, a cathode and a control grid connected to apply high-frequency control current to said control electrodes for rendering said arc discharge devices conducting to supply low-frequency current to said load device, a source of energizing potential connected across said anode and cathode for operating said generator, means for applying a blocking potential to said control grid to normally maintain said space discharge device non-conducting, and means for applying a potential to said control grid to overcome said blocking potential for a predetermined interval of time to permit the operation of said generator, thereby rendering said arc discharge devices conducting to supply low-frequency current to said load device during a corresponding interval.

6. An electric system comprising, in combination, a source of low frequency current, a load device, circuit means connecting the load device to the current source including a pair of inversely connected uni-directional conducting valves for permitting successive half cycles of the low-frequency current to flow, a control electrode in each valve, means for applying a biasing potential to each control electrode for normally maintaining said valves in the non-conducting state, and means for applying a high-frequency ionizing potential to each of said valves for rendering them conducting to permit the flow of low-frequency current to said load device.

7. An electric system comprising, in combination, a source of low-frequency current, a load device, circuit means connecting the load device to the current source including a pair of inversely connected uni-directional conducting valves for permitting successive half cycles of the low-frequency current to flow, a control electrode in each valve, means for applying a biasing potential to each control electrode for normally maintaining said valves in the non-conducting state, and means for applying a high-frequency ionizing potential to each of said valves for a predetermined interval of time to render said valves conducting during said interval, thereby permitting a predetermined number of half cycles of the low-frequency current to flow to said load device.

8. An electric system comprising, in combination, a source of low-frequency current, a load device, circuit means connecting the load device to the current source including a uni-directional conducting valve disposed to permit the flow of the low-frequency current in half cycle increments, a first control electrode in said valve, means for applying a biasing potential to said first control electrode for normally maintaining said valve in the non-conducting state, a second control electrode in said valve, and means for applying a high-frequency ionizing potential to said second control electrode for rendering said valve conducting to permit the flow of low-frequency current to said load device.

9. An electric system comprising, in combination, a source of low frequency current, a load device, circuit means connecting the load device to the current source including a pair of inversely connected uni-directional conducting valves for permitting successive half cycles of the low-frequency current to flow, a first control electrode in each valve, means for applying a biasing potential to each of said first control electrodes for normally maintaining said valves in the non-conducting state, a second control electrode in each of said valves, and means for applying a high-frequency ionizing potential to each of said second control electrodes for rendering said valves conducting to permit the low-frequency current to flow to said load device.

10. An electric system comprising, in combination, a source of low-frequency current, a load device, circuit means connecting the load device to the current source including uni-directional conducting valve means for permitting the low-frequency current to flow in half cycle increments, a high-frequency current generator connected to render said valve means conducting, and means including a capacitor for operating said generator for a time interval depending upon the discharge rate of the capacitor.

11. An electric system comprising, in combination, a source of low-frequency current, a load device, circuit means connecting the load device to the current source including uni-directional conducting valve means for permitting the low-frequency current to flow in half cycle increments, a high-frequency current generator connected to render said valve means conducting, a capacitor, means for charging said capacitor to a predetermined potential, and means for connecting said capacitor to energize said generator at a predetermined instant in a half cycle of the low-frequency current and for an interval of time depending upon the discharge rate of said capacitor.

12. In an electric valve translating circuit connected to control the flow of current from a source of alternating current to a load device, in combination, an electric valve having an anode, a cathode, and a control electrode, and a control circuit for said control electrode including a capacitor connected between said cathode and control electrode to maintain the control electrode at a fixed potential relative to the cathode regardless of the potential applied to said anode, a source of direct current for charging said capacitor and applying a negative potential to said control electrode to maintain the valve in the non-conducting state, a plurality of resistors connected in series circuit relation with said direct current source, rectifying means connected in shunt circuit relation with one of said resistors in such manner as to oppose the flow therethrough of current from said direct current source, and means for applying to the control circuit high-frequency current for oppositely charging said capacitor through said rectifying means and causing said valve to become conducting.

13. In an electric valve translating circuit connected to control the flow of current from a source of alternating current to a load device, in combination, an electric valve having an anode, a cathode, and a control electrode, and a control circuit for said control electrode including a resistor connected to the control electrode, an inductor connected in series circuit relation with said resistor and disposed to have induced therein high-frequency current, a source of direct current connected to apply a negative potential to said control electrode through said inductor and resistor, and a variable capacitor connected to tune the control circuit to be responsive to a predetermined frequency for overcoming the negative potential applied to said control electrode and causing said valve to become conducting.

14. In an electric valve translating circuit connected to control the flow of current from a source of alternating current to a load device, in combination, an electric valve having an anode, a cathode, and a control electrode, and a control circuit for said control electrode including a capacitor connected between said cathode and control electrode to maintain the control electrode at a fixed potential relative to the cathode regardless of the potential applied to said anode, a source of direct current for charging said capacitor and applying a negative potential to said control electrode to maintain the valve in the non-conducting state, a plurality of resistors connected in series circuit relation with said direct current source, rectifying means connected in shunt circuit relation with one of said resistors in such manner as to oppose the flow therethrough of current from said direct current source, means for applying to the control circuit high-frequency current for oppositely charging said capacitor through said rectifying means to cause said valve to become conducting, and means for tuning the control circuit to be responsive only to the application of a predetermined frequency.

15. In an electric valve translating circuit connected to control the flow of current from a source of alternating current to a load device, in combination, an electric valve having an anode, a cathode, and a control electrode; a control circuit for said control electrode including a capacitor connected between said cathode and control electrode to maintain the control electrode at a fixed potential relative to the cathode regardless of the potential applied to said anode, a resistor connected to said control electrode, and a source of direct current connected to charge said capacitor through said resistor and to apply a negative potential to said control electrode to maintain the valve in the non-conducting state; capacitance means juxtaposed to said valve, and means for applying high-frequency control potential between said capacitance means and said cathode to cause said valve to become conducting.

16. In an electric valve translating circuit connected to control the flow of current from a source of alternating current to a load device, in combination, an electric valve having an anode, a cathode, and two control electrodes; a control circuit for one of said control electrodes including a capacitor connected between said cathode and said one control electrode to maintain the control electrode at a fixed potential relative to the cathode regardless of the potential applied to said anode, a resistor connected to the electrode, and a source of direct current connected to charge said capacitor through said resistor and to apply a negative potential to the control electrode to maintain the valve in the non-conducting state; and means for applying a high-frequency ionizing potential between the other control electrode and said cathode to cause said valve to become conducting.

17. In an electric valve translating system, in combination, a plurality of gaseous electric valves for controlling the flow of current from a source of current to a load device individual to each valve, a control electrode individual to each valve, means for applying a biasing potential to each control electrode to maintain said valves in the non-conducting state, means for generating a plurality of high frequencies, each individual to a valve, means for applying said high frequencies to said valves for rendering them conducting, and means for rendering each valve responsive only to its individual frequency.

18. An electric system comprising, in combination, a source of low-frequency current, a load device, high voltage circuit means connecting the load device to the current source including a valve disposed to permit the flow of the low-frequency current in a high voltage circuit, a control electrode in said valve, means for applying a biasing potential to said control electrode for normally maintaining said valve in a non-conducting state, high frequency generating means connected in a low voltage circuit and including coupling means, insulated from said low voltage circuit, for transmitting high frequency current for overcoming said biasing means to initiate the flow of low-frequency current to said load device at the time said valve means receives energy from said generating means, and means for controlling the functioning of said high frequency generating means for permitting the initiation of the flow of the low-frequency current to said load device at a time determined by a voltage wave of said low frequency source.

19. In an electric valve translating system, in combination, a plurality of gaseous electric valves for controlling the flow of current to a load device individual to each valve, means for generating a plurality of high frequencies, each individual to a valve, means for applying said high frequencies to said valves for rendering them conducting, and means for rendering each valve responsive only to its individual frequency.

20. Apparatus for supplying power from a source to a load comprising an electric valve having a control electrode for conducting current from said source to said load, means for generating a high frequency potential, means for coupling said high frequency potential generating means to said control electrode to control the conductivity of said valve, means for initiating the operation of said generating means and means for interrupting the operation of said generating means a predetermined interval of time after its initiation.

21. In combination with a plurality of electric discharge devices each having an anode, a cathode and a control electrode, circuit connections in which it is desired to maintain the potentials of said cathodes independent of each other, a source of periodic voltage for supplying energy to said discharge devices, a source of periodic voltage of a frequency substantially higher than that of the first-mentioned source and connected to supply power to the primary of a transformer, said transformer having a plurality of secondary windings individual, respectively, to said discharge devices and connected to supply a control voltage between the control electrode and cathode of each.

22. An electric system comprising, in combination, a source of low-frequency current, a load device, circuit means connecting the load device to the current source including a pair of unidirectional conducting valves for permitting the low-frequency current to flow in half cycle increments, both of said valves having principal electrodes, circuit connections in which the potentials of the homologous principal electrodes of said valves are maintained independent of each other, high-frequency current means to initiate the flow of low-frequency current to said load device at the time said valves receive energy from said high frequency current means, said high-frequency current means including connections individual to each valve through which the high frequency is applied to the valves, the high-frequency current connections associated with one of said valves being insulated from the connections associated with another of said valves, and means for permitting the application of said high-frequency current to be initiated at a time determined by the voltage waves of said source.

23. Apparatus according to claim 22 characterized by the fact that the high-frequency current means includes an output transformer and the connections include secondaries of the transformer, the secondaries of the transformer being individual to the valves and each secondary being insulated from the other windings of the transformer.

24. In a translating system for supplying a plurality of loads in combination, a separate gaseous electric valve, individual to each said load, means for generating a plurality of high-frequency currents, each current having a characteristic frequency and corresponding to a valve, means for rendering each valve responsive only to the frequency corresponding to it and connections individual to each valve for applying the corresponding high frequency to said valve, the connections corresponding to a particular valve being insulated from the connections corresponding to the other valves.

25. In a translating system for supplying a plurality of loads in combination, a separate gaseous electric valve, independent to each said load, means for generating a plurality of high frequency currents, each current having a different frequency and corresponding to a valve, and connections individual to each valve for applying the corresponding high frequency to said valve, the connections corresponding to a particular valve being insulated from the connections corresponding to the other valves.

26. Apparatus according to claim 25 characterized by the fact that the high-frequency generating means has an output transformer and each of the connections includes a separate secondary of said transformer.

JOHN W. DAWSON.

DISCLAIMER 2,106,831.—*John W. Dawson*, Wilkinsburg, Pa. ELECTRIC CONTROL SYSTEMS. Patent dated February 1, 1938. Disclaimer filed February 28, 1940, by the assignee, *Westinghouse Electric & Manufacturing Company*.

Hereby enters this disclaimer to claims 1, 2, 3, 4, 10, and 20 in said specification.
[*Official Gazette March 26, 1940.*]